United States Patent [19]

Campbell et al.

[11] 3,904,553

[45] Sept. 9, 1975

[54] THERMALLY STABLE COMPOSITE BASE METAL OXIDE CATALYSTS

[75] Inventors: Larry E. Campbell, Corning; Robert L. Johnson, Beaver, both of N.Y.

[73] Assignee: Corning Glass Works, Corning, N.Y.

[22] Filed: Aug. 20, 1973

[21] Appl. No.: 389,969

[52] U.S. Cl............... 252/465; 252/466 J; 252/468; 252/470; 252/471; 252/474
[51] Int. Cl.² ............... B01J 23/16; B01J 23/62; B01J 23/82; B01J 23/84
[58] Field of Search......... 252/465, 466 J, 468, 470, 252/471, 474

[56] References Cited
UNITED STATES PATENTS

| | | |
|---|---|---|
| 3,001,929 | 9/1961 | Moy et al....................... 252/465 X |
| 3,363,023 | 1/1968 | Mooi et al. ...................... 252/465 X |
| 3,595,810 | 7/1971 | Kehl.................................... 252/468 |
| 3,626,021 | 12/1971 | Michaels et al................. 252/465 X |
| 3,787,332 | 1/1974 | Sugier............................. 252/471 X |

*Primary Examiner*—Paul F. Shaver
*Attorney, Agent, or Firm*—Kees van der Sterre; Clinton S. Janes, Jr.; Clarence R. Patty, Jr.

[57] ABSTRACT

A composite base metal oxide catalyst of improved high temperature stability is provided by prereacting a selected base metal oxide catalyst or its precursor compounds with a selected refractory high-surface-area spinel or its precursor compounds to form a crystalline solid solution of the catalyst and the spinel. This solid solution has the properties of good catalytic activity and high temperature structural and surface area stability. An example of such a composite catalyst is $CuCr_2O_4$ in solid solution with $NiAl_2O_4$.

7 Claims, No Drawings

THERMALLY STABLE COMPOSITE BASE METAL OXIDE CATALYSTS

BACKGROUND OF THE INVENTION

The use of base metal oxides such as copper chromite and cobalt oxide as catalysts for oxidation-reduction, hydrogenation, hydrosulfurization, dehydrogenation and other reactions is known. In addition, base metal oxide catalysts such as copper chromite have also been proposed for use in high temperature processes such as the treatment of automotive exhaust gases to remove carbon monoxide, nitrogen oxides, and unburned hydrocarbons therefrom.

Unfortunately, many of the known base metal oxide catalysts do not demonstrate sufficient stability for use in high temperature processes. Thus, at temperatures in excess of about 600°C., degradation mechanisms such as sintering and interaction between the catalyst and its support begin to reduce the catalytic activity of many commonly-used oxides below useful levels. For automotive applications in particular, where reaction temperatures may reach 800°C. or higher, high temperature stability in the catalyst employed is essential. Even slight losses in activity may reduce catalytic efficiency below levels required to enable motor vehicles to meet government regulations.

In the prior art, means such as close compositional control and the use of minor additions of stabilizing oxides have been employed in attempts to stabilize the activity of base metal catalysts at high temperatures. However, to our knowledge, none of the commonly used stabilizing procedures are effective to stabilize a wide variety of base metal oxide catalysts at temperatures in the 800°–900°C. temperature applications.

Accordingly, it is the principal object of the present invention to provide a method of thermally stabilizing base metal oxides, particularly for use as catalysts in high temperature oxidation-reduction processes.

It is a further object to provide novel composite catalysts containing active base metal oxides which provide both excellent thermal stability and a high level of catalytic activity for oxidation and reduction processes.

Other objects and advantages of the invention will become apparent from the following description.

SUMMARY OF THE INVENTION

We have now discovered a method of stabilizing certain base metal oxide catalysts which essentially comprises prereacting these catalysts with certain refractory high-surface-area spinels to provide a composite material with both good catalytic activity and high temperature stability. The composite material is characterized as containing a solid solution of the catalyst in the spinel, rather than as a simple mixture of spinels. To briefly describe our method, a selected base metal oxide catalyst of spinel structure or precursor compounds thereof are reacted with a selected refractory high-surface area spinel or its precursor compounds by heating to a temperature at which a solid solution of the component oxides of the catalyst and spinel is formed. For the purposes of the present description, precursor compounds of a selected catalyst or spinel are compounds which, when heated together in the proper proportions, will react to form the selected catalyst or spinel. Examples of precursor compounds commonly employed in carrying out the method of the present invention include the nitrates, carbonates, oxides and hydrous oxides of the metallic components of the selected catalysts and spinels.

Base metal oxide catalysts which may be stabilized according to this invention include $Co_3O_4$, $CoFe_2O_4$, $CoMn_2O_4$, $CuCr_2O_4$, $CuFe_2O_4$, $CuMn_2O_4$, $ZnCo_2O_4$ and $CuCo_2O_4$. Stabilization of these catalysts is achieved by forming solid solutions thereof with refractory high-surface-area spinels such as $NiAl_2O_4$, $MgAl_2O_4$, $ZnAl_2O_4$, $CoAl_2O_4$, $CuAl_2O_4$, $CdAl_2O_4$, $MnAl_2O_4$, $NiCr_2O_4$, $CoCr_2O_4$, and $MgCr_2O_4$.

The resulting thermally stable composite base metal oxide catalysts may be described as comprising crystalline solid solutions which consist essentially of at least one base metal oxide catalyst selected from the group consisting of $Co_3O_4$, $CoFe_2O_4$, $CoMn_2O_4$, $CuCr_2O_4$, $CuFe_2O_4$, $CuMn_2O_4$, $ZnCo_2O_4$ and $CuCo_2O_4$ in solid solution with at least one refractory high-surface-area spinel selected from the group consisting of $NiAl_2O_4$, $MgAl_2O_4$, $ZnAl_2O_4$, $CoAl_2O_4$, $CuAl_2O_4$, $CdAl_2O_4$, $MnAl_2O_4$, $NiCr_2O_4$, $CoCr_2O_4$, and $MgCr_2O_4$.

DETAILED DESCRIPTION

As previously noted, two major forms of degradation of base metal oxide catalysts are sintering, resulting in a substantial loss of catalytically active surface area, and interaction between the catalyst and its support to form catalytically inactive or less active species.

The amount of degradation from sintering alone can be substantial as evidenced by the data shown below in Table I relating to the surface area and related catalytic activity of certain base metal oxide catalysts not treated according to the present invention. These catalysts were prepared by coprecipitating the hydrous oxides of the metallic constituents of the catalysts from nitrate solutions of appropriate composition with ammonium hydroxide, washing drying, and firing to 600°C. to convert the hydrous oxide mixtures to the catalysts. The catalysts were subsequently fired to 800° and 900°C. for 16 hours in consecutive treatments to determine the effects of temperature on surface area and activity. Surface areas were determined by nitrogen B.E.T. and catalytic activities were determined using a differential scanning calorimeter to measure oxidation rate as a function of temperature. The differential scanning calorimeter (D.S.C.) data shown are the temperatures at which the exotherm from the oxidation of known fixed quantities of n-hexane and carbon monoxide (separately determined) are 50% of maximum. Lower 50% conversion temperatures indicate a more active catalyst. Surface areas are in meters$^2$ per gram, and 50% D.S.C. conversion temperatures are in °F.

TABLE I

| Catalyst Composition | Initial Surface Area | Surface Area After 800°C.-16 hrs. | Surface Area After 900°C.-16 hrs. | Initial D.S.C. Activity (50%) $C_6H_{14}$/CO | Activity After 800°C.-16 hrs. $C_6H_{14}$/CO | Activity After 900°C.-16 hrs. $C_6H_{14}$/CO |
|---|---|---|---|---|---|---|
| $Co_3O_4$ | 11 | 4.5 | 0.4 | 416/ — | 495/340 | 550/460 |
| $CuCr_2O_4$ | 9.7 | 1.5 | 0.7 | 520/390 | 590/460 | 630/510 |
| $CuFe_2O_4$ | 8 | 0.1 | <0.1 | 510/390 | 700/600 | |
| $ZnCo_2O_4$ | 16 | 3.3 | <0.1 | 440/320 | 510/370 | 610/410 |

TABLE I-continued

| Catalyst Composition | Initial Surface Area | Surface Area After 800°C.-16 hrs. | Surface Area After 900°C.-16 hrs. | Initial D.S.C. Activity (50%) $C_6H_{14}/CO$ | Activity After 800°C.-16 hrs. $C_6H_{14}/CO$ | Activity After 900°C.-16 hrs. $C_6H_{14}/CO$ |
|---|---|---|---|---|---|---|
| $CuCo_2O_4$ | 17 | 0.3 | <0.1 | 400/270 | 560/370 | 630/420 |

An example of the degradation of a base metal oxide catalyst through interaction with its support is the case of $CuCr_2O_4$ supported on alumina. After firing for 16 hours at 800°C., X-ray examination discloses the formation of a copper aluminate solid solution phase and a $Cr_2O_3$ phase, both of which are less active than copper chromite for the oxidation of carbon monoxide and hydrocarbons.

In contrast to the low thermal stability of base metal oxide catalysts as above described, certain arrangements of refractory oxides have and maintain a high surface area at temperatures in the 800°–900°C. range of present interest. Like the base metal oxides previously shown, these refractory high-surface-area materials are of spinel structure; however their catalytic activity for oxidation-reduction reactions in the 200°–900°C. temperature range is negligible.

Examples of such thermally stable high-surface-area spinels and data showing the retention of substantial surface area by these structures even after exposure to elevated temperatures are set forth in Table II below. The spinels were prepared by coprecipitating the hydroxides of the selected metals in the proper proportions from appropriate solutions of the soluble salts of these metals, filtering and/or evaporating to dryness, and firing to 600°C. for 1 hour. Surface areas are given in meters$^2$ per gram.

TABLE II

High-Surface-Area Spinels

| Spinel Composition | SURFACE AREAS | | |
|---|---|---|---|
|  | As Prepared | After 16 Hours at 800°C. | After 16 Hours at 900°C. |
| $NiAl_2O_4$ | 200 | 97 | 43 |
| $ZnAl_2O_4$ | 79 | 26 | 16 |
| $CoAl_2O_4$ | 48 | 24 | 7 |
| $MgAl_2O_4$ | 125 | 91 | 67 |
| $MgCr_2O_4$ | 44 | 17 | 11 |
| $CuAl_2O_4$ | 204 | 117 | — |

Surprisingly, we have found that refractory spinels such as shown above in Table II will react with base metal catalysts of spinel structure such as are shown in Table I to form solid solutions which provide a combination of the desirable properties of each spinel component. Thus, the solid solutions formed demonstrate both good high temperature stability and a high degree of catalytic activity for the oxidation of carbon monoxide and hydrocarbons. In general, the best combination of catalytic activity, high surface area and thermal stability is provided by solid solutions containing about 50 mole percent total of base metal oxide catalyst spinels and 50 mole percent total of refractory high-surface-area spinels; however, good performance can be extended to compositions containing as little as 10 mole percent or as much as 75 mole percent of the base metal oxide catalyst component.

Catalyst systems which either comprise or consist essentially of solid solutions as above described are termed composite base metal oxide catalysts. The presence in such systems of at least some quantity of a solid solution of a base metal oxide catalyst spinel in a refractory high-surface-area spinel is essential in achieving both catalytic activity and thermal stability according to the invention. However, systems comprising a suitable solid solution in combination with, for example, an excess of a refractory high surface area spinel component, may display a useful degree of activity and stability for certain applications. Nevertheless, systems consisting essentially of the described solid solutions are preferred.

The method by which the described solid solutions are prepared is important. The preferred technique is the one which assures the greatest uniformity in the mixture of solid solution components before reaction by thermal treatment. Thus, where the catalyst component and the spinel component of the solid solution may be directly mixed and reacted, we prefer to form an intimate mixture containing both the precursor compounds of the catalyst and the precursor compounds of the spinel, and then to react this mixture by thermal treatment to form a catalytically active solid solution. Mixtures of base metal nitrates, carbonates or other thermally decomposable salts are suitable for this purpose. Particularly preferred are precursors consisting of the hydrous oxides of the metallic solid solution components, especially when formed by simultaneous precipitation from aqueous solutions of metal salts with ammoniacal precipitating agents such as $NH_3$-vapor or $NH_4OH$.

Temperatures and times required to form the desired solid solutions depend on the nature of the mixture being treated. Generally, however, treatment at temperatures in the range of about 400°–800°C. for times ranging from several minutes to a few hours are suitable. The presence of the desired solid solution crystal phase may be ascertained by conventional X-ray diffraction techniques. Incomplete reaction of the precursor compounds or catalyst-spinel mixtures will result in an X-ray pattern indicating the presence of more than one crystal phase, whereas in general preferred solid solutions produced according to the invention shows only a single crystal phase.

In general, no substantial benefits accrue from the presence of free excess oxides such as CuO, CoO, NiO, etc., mixed with the solid solution structure, and it is therefore desirable that the solid solution be essentially free of excess oxides which are not constituents of the spinel structures of either the base metal oxide catalysts or the refractory high-surface-area spinels. However, the presence of such excess free oxides may be tolerated if the stability of the solid solution remains unaffected thereby.

Examples of catalytically active spinel solid solutions prepared according to the invention are shown below in Table III. The first four columns in the Table set forth the catalytically-active spinels treated, the thermal treatment and resulting surface area of the pure materials, and the catalytic activity of each material as initially prepared and after 800° and 900°C. treatments. Catalytic activities are expressed in degrees Fahrenheit for 50% conversion of n-hexane and carbon monoxide in accordance with the differential scanning calorimeter method employed in generating the data shown above in Table I. The remaining six columns of data in Table III set forth surface area and catalytic activity for solid solutions of each catalyst with three different high-surface-area spinels: $NiAl_2O_4$, $ZnAl_2O_4$ and $MgAl_2O_4$. All solid solutions are equimolar catalyst-spinel compositions. The surface area and activity of each solid solution is given both as initially prepared and after thermal aging treatmentss in air. The bottom row of data in Table III sets forth surface area results for the uncombined high-surface-area spinels.

All of the samples shown in Table III are powders prepared by coprecipitating the hydrous oxides of the metallic constituents, filtering, washing, drying at 110°C. for 16 hours and firing at 600°C. for 1 hour.

tures with the formation of relatively inactive alumina-chromia solid solutions. Nickel oxide, cuprous chromite and copper chromite are formed in the $NiO.CuCr_2O_4$ system at 900°C., and drastic losses in surface area and activity are observed. One advantage of using both NiO and $Al_2O_3$ spinel components to form a catalyst-spinel solid solution resides in the fact that the phase separations which cause degradation in simpler systems are prevented.

The initial activities of solid solutions produced according to the invention do not exceed the initial activities of the uncombined catalyst components in all cases. However, the thermal stability of the stabilized catalyst insures nearly equivalent activity after short-term high-temperature aging such as described herein, and greatly improved long-term stability is expected under high temperature conditions due to the physical

TABLE III

| Catalyst Composition | Thermal Treatment °C. (16 hrs.) | Uncombined Catalyst | | Catalyst-$NiAl_2O_4$ Solid Solution | | Catalyst-$ZnAl_2O_4$ Solid Solution | | Catalyst-$MgAl_2O_4$ Solid Solution | |
|---|---|---|---|---|---|---|---|---|---|
| | | Surface Area ($m^2/g$) | 50% D.S.C. $C_6H_{14}$/CO (°F.) | Surface Area ($m^2/g$) | 50% D.S.C. $C_6H_{14}$/CO (°F.) | Surface Area ($m^2/g$) | 50% D.S.C. $C_6H_{14}$/CO (°F.) | Surface Area ($m^2/g$) | 50% D.S.C. $C_6H_{14}$/CO (°F.) |
| $CuCr_2O_4$ | 600 | 9.7 | 520/390 | 74 | 510/330 | 43 | 480/320 | 98 | 530/460 |
| | 800 | 1.5 | 590/460 | 7.2 | 530/410 | 7.0 | 580/450 | 23 | 640/540 |
| | 900 | 0.7 | 630/510 | 5.9 | 620/460 | 3.0 | 600/490 | 14 | 620/520 |
| $CuMn_2O_4$ | 600 | 11 | 420/340 | 124 | 410/260 | 90 | 360/250 | 217.4 | 400/300 |
| | 800 | 6 | 530/430 | 8.0 | 510/340 | 2.6 | 530/430 | 9.0 | 510/430 |
| | 900 | 0.4 | 610/520 | — | — | — | — | — | — |
| $Co_3O_4$ | 600 | 11 | 416/- | 74 | 470/310 | 67 | 490/320 | 52.5 | 560/410 |
| | 800 | 4.5 | 495/340 | 20 | 450/280 | 11 | 480/300 | 27 | 550/370 |
| | 900 | 0.1 | 550/460 | — | — | — | — | — | — |
| $CuFe_2O_4$ | 600 | 8 | 510/390 | 54 | 570/300 | 61 | 495/310 | 71.8 | 545/380 |
| | 800 | 0.1 | 700/600 | 16 | 590/340 | — | 635/470 | 10.0 | 630/490 |
| | 900 | — | — | — | — | 65 | 725/625 | — | — |
| $ZnCo_2O_4$ | 600 | 16 | 440/320 | 60 | 470/300 | 43.6 | 530/340 | 73.5 | 610/410 |
| | 800 | 3.3 | 510/370 | 8.0 | 460/310 | 12.6 | 530/360 | 14.6 | 570/400 |
| | 900 | 0.1 | 610/410 | — | — | — | — | — | — |
| $CoMn_2O_4$ | 600 | 12 | 420/420 | 132 | 400/370 | 84.6 | 410/420 | 60.7 | 440/490 |
| | 800 | 5 | 550/620 | 15 | 510/570 | 9.9 | 500/610 | 22.0 | 470/650 |
| | 900 | — | — | — | — | — | — | — | — |
| $CoFe_2O_4$ | 600 | 17.9 | 590/360 | 54 | 570/300 | 63.3 | 600/320 | 74.8 | 620/380 |
| | 800 | 0.1 | 720/660 | 16 | 590/340 | 11.2 | 680/500 | 20.3 | 630/380 |
| | 900 | — | — | — | — | — | — | — | — |
| $CuCo_2O_4$ | 600 | 17 | 400/270 | 72 | 570/390 | 61.8 | 500/290 | 84.1 | 600/440 |
| | 800 | 0.3 | 560/370 | 0.7 | 540/370 | 2.0 | 520/300 | 22.0 | 570/360 |
| | 900 | 0.1 | 630/420 | — | — | — | — | — | — |
| None | 600 | — | — | 200 | — | 79 | — | 125 | — |
| | 800 | — | — | 97 | — | 26 | — | 91 | — |
| | 900 | — | — | 43 | — | 16 | — | 67 | — |

From the data shown above in Table III the increased stability of the solid solutions as compared to their catalytically active components at temperatures in the 800°–900°C. range is readily apparent. A typical example of the effectiveness of the method is the system $CuCr_2O_4$-$NiAl_2O_4$. $NiAl_2O_4$ has relatively high surface area even after thermal treatment at 900°C. for 16 hours air, asir, but demonstrates essentially no catalytic activity for the oxidation of n-hexane or carbon monoxide. $CuCr_2O_4$ demonstrates good initial activity for the oxidation of both carbon monoxide and n-hexane, but suffers marked losses in both activity and surface area after thermal treatment at 800°and 900°C. Equimolar solid solutions of $CuCr_2O_4$ in $NiAl_2O_4$, on the other hand, demonstrate both better initial activity and better high temperature stability than copper chromite alone, despite the dilution effect of $NiAl_2O_4$.

The beneficial effects of combining high-surface-area spinels such as $NiAl_2O_4$ with active base metal catalysts such as $CuCr_2O_4$ are not obtained when the spinel components $Al_2O_3$ and NiO are employed separately. X-ray data indicates that phase separation occurs in copper chromite-alumina solid solutions at higher temperaand chemical stability of the spinel solid solutions produced.

Preferred stabilized catalysts according to the invention include those consisting essentially of $NiAl_2O_4$ in solid solution with a base metal oxide catalyst of spinel structure selected from the group consisting of $Co_3O_4$, $CoFe_2O_4$, $CuCr_2O_4$, $CuFe_2O_4$, $CuMn_2O_4$, $CuCo_2O_4$, and $ZnCo_2O_4$. Also preferred are catalysts consisting essentially of $ZnAl_2O_4$ in solid solution with any of the aforementioned base metal oxide catalysts or $CoMn_2O_4$. $Mg_2Al_2O_4$ in solid solution with $CuFe_2O_4$ is also a preferred catalyst.

The effectiveness of stabilized catalysts produced according to the invention can also be evaluated from bench testing data showing the oxidation of carbon monoxide and hydrocarbons and the reduction of nitrogen oxides by catalytic converters employing these catalysts. The converters consist of catalyst-spinel solid solutions despersed on refractory ceramic monolithic support structures of the honeycomb type. Catalyst evaluation involves the determination of converter temperatures at which 20%, 50% and 80% of the carbon monoxide, propylene and nitrogen oxide constituents of a test gas stream are converted to harmless constituents. Alternately, the percent conversion of these constituents at projected operating temperatures (about 1,100°F.) under steady-state conditions may be determined.

The test gas employed for these evaluations is a simulated exhaust gas mixture containing 1.0% carbon monoxide, 250 ppm. propylene, 1,000 ppm. nitric oxide, 10% water vapor, 0–1.25% oxygen and the balance nitrogen by volume. This mixture is passed through the converter at a space velocity of about 15,000 hr.$^{-1}$. Oxygen levels are maintained at about 1.25% for the oxidation evaluations and varied from 0–1.25% for the for the reduction evaluations.

Table IV below gives some oxidation results for several supported catalyst-spinel solid solutions produced according to the invention. The results are given in terms of converter temperature (in degrees Fahrenheit) required for 20%, 50% and 80% conversion of propylene and carbon monoxide. Each converter is evaluated after initial firing at 600°C. for 16 hours and again after heat treatment at 800°C. for 16 hours. The catalysts are applied to the converter by precipitating the mixed hydrous oxides of the metallic catalyst constituents onto a wash layer of the refractory high-surface-area spinel previously deposited on the converter, and thereafter firing at 600°C. for 16 hours to insure formation of the desired solid solutions.

are the compositions of the catalysts, the heat treatment employed, and the percent conversions of carbon monoxide, propylene and nitric oxide at 1100°F. and 15,000 hr$^{-1}$. The converters are prepared according to the procedure employed in making the converters used in generating the data shown above in Table IV.

TABLE V

| Catalyst-Spinel Solid Solution | Thermal Treatment (°C.-hr.) | Percent Conversion | | |
|---|---|---|---|---|
| | | NO | CO | Propylene |
| CuMn$_2$O$_4$- | 600–16 | 99 | 95 | 97 |
| NiAl$_2$O$_4$ | 800–16 | 98 | 95 | 96 |
| CuFe$_2$O$_4$- | 600–16 | 99 | 93 | 96 |
| NiAl$_2$O$_4$ | 800–16 | 99 | 94 | 96 |
| CuMn$_2$O$_4$- | 600–16 | 93.5 | 72 | 45 |
| ZnAl$_2$O$_4$ | 800–16 | 97 | 93 | 80 |
| CuFe$_2$O$_4$- | 600–16 | 80 | 87 | 71 |
| ZnAl$_2$O$_4$ | 800–16 | 89 | 91 | 79 |

From the data shown above in Table V the effectiveness catalyst-spinel solid solutions in maintaining high conversion efficiency even after exposure to elevated temperatures is readily apparent.

We claim:

1. A process of stabilizing a base metal oxide catalyst of spinel structure selected from the group consisting of Co$_3$O$_4$, CoFe$_2$O$_4$, CoMn$_2$O$_4$, CuCr$_2$O$_4$, CuFe$_2$O$_4$, CuMn$_2$O$_4$, CuCo$_2$O$_4$ and ZnCo$_2$O$_4$ against high temperature degradation which comprises reacting said cata-

TABLE IV

| Catalyst-Spinel Solid Solution | Thermal Treatment °C.-hrs. | Propylene Conversion Temperatures (°.) | | | CO Conversion Temperatures (°F.) | | |
|---|---|---|---|---|---|---|---|
| | | 20% | 50% | 80% | 20% | 50% | 80% |
| CuMn$_2$O$_4$- | 600–16 | 515 | 535 | 590 | 320 | 400 | 480 |
| NiAl$_2$O$_4$ | 800–16 | 550 | 620 | 725 | 385 | 505 | 660 |
| CuFe$_2$O$_4$- | 600–16 | 535 | 585 | 655 | 380 | 435 | 525 |
| NiAl$_2$O$_4$ | 800–16 | 615 | 685 | 785 | 490 | 590 | 670 |
| ZnCo$_2$O$_4$- | 600–16 | 575 | 620 | 710 | 385 | 440 | 495 |
| NiAl$_2$O$_4$ | 800–16 | 630 | 685 | 845 | 425 | 470 | 585 |
| CuCo$_2$O$_4$- | 600–16 | 585 | 660 | 740 | 365 | 440 | 515 |
| NiAl$_2$O$_4$ | 800–16 | 655 | 735 | 835 | 435 | 495 | 590 |
| Co$_3$O$_4$- | 600–16 | 615 | 650 | 690 | 420 | 455 | 500 |
| NiAl$_2$O$_4$ | 800–16 | 595 | 640 | 715 | 405 | 450 | 550 |
| CoFe$_2$O$_4$- | 600–16 | 665 | 735 | 790 | 600 | 735 | 890 |
| NiAl$_2$O$_4$ | 800–16 | 715 | 790 | 905 | 510 | 585 | 770 |
| CuCr$_2$O$_4$- | 600–16 | 550 | 610 | 725 | 300 | 395 | 480 |
| NiAl$_2$O$_4$ | 800–16 | 630 | 710 | 800 | 370 | 490 | 650 |
| CuMn$_2$O$_4$- | 600–16 | 485 | 525 | 680 | 370 | 445 | 680 |
| ZnAl$_2$O$_4$ | 800–16 | 590 | 735 | 840 | 515 | 650 | 840 |
| CuFe$_2$O$_4$- | 600–16 | 540 | 615 | 800 | 375 | 445 | 630 |
| ZnAl$_2$O$_4$ | 800–16 | 665 | 785 | 965 | 565 | 705 | 920 |
| ZnCo$_2$O$_4$- | 600–16 | 615 | 655 | 720 | 430 | 470 | 510 |
| ZnAl$_2$O$_4$ | 800–16 | 695 | 755 | 810 | 500 | 565 | 700 |
| CuCo$_2$O$_4$- | 600–16 | 525 | 615 | 740 | 400 | 445 | 605 |
| ZnAl$_2$O$_4$ | 800–16 | 765 | 900 | 1005 | 545 | 605 | 895 |
| Co$_3$O$_4$- | 600–16 | 525 | 615 | 740 | 400 | 445 | 605 |
| ZnAl$_2$O$_4$ | 800–16 | 700 | 775 | 830 | 510 | 545 | 650 |
| Co$_3$O$_4$- | 600–1 | 535 | 605 | 615 | 410 | 425 | 460 |
| ZnAl$_2$O$_4$ | 800–16 | 675 | 720 | 815 | 475 | 525 | 600 |
| CoFe$_2$O$_4$- | 600–1 | 600 | 655 | 730 | 565 | 695 | 885 |
| ZnAl$_2$O$_4$ | 800–16 | 720 | 830 | 1010 | 665 | 830 | 1120 |

The activity of similarly prepared catalytic converters may also be evaluated from conversion efficiency data under steady-state operating conditions. For these evaluations, the percent conversion of propylene, carbon monoxide and nitric oxide present in the above-described simulated exhaust gas mixture is measured at converter temperatures of 1,100°F. and a space velocity of about 15,000 hr$^{-1}$. The oxygen content of the test gas mixture is maintained at an average in the range of about 0.25–0.55% by volume.

Table V below sets forth steady-state conversion data for several converters employing the catalyst-spinel solid solutions of the invention. Included in the Table lyst prior to use with a refractory high-surface-area spinel selected from the group consisting of NiAl$_2$O$_4$, MgAl$_2$O$_4$, ZnAl$_2$O$_4$, CoAl$_2$O$_4$, CuAl$_2$O$_4$, CdAl$_2$O$_4$, MnAl$_2$O$_4$, NiCr$_2$O$_4$, CoCr$_2$O$_4$ and MgCr$_2$O$_4$ to provide a stable composite catalyst material comprising a solid solution which consists essentially of said base metal oxide catalyst in solid solution with said refractory high-surface-area spinel.

2. A process according to claim 1 wherein said catalyst is reacted with said high-surface-area spinel by heating a mixture consisting essentially of said catalyst or precursor compounds thereof and said high-surface-area spinal or precursor compounds thereof at a temperature in the range of about 400°–800°C. for a time sufficient to achieve some solid solution of said catalyst in said high-surface-area spinel.

3. A process according to claim 2 wherein said mixture consists essentially of precursor compounds selected from the group consisting of the hydrous oxides of the metallic components of said catalyst and said high-surface-area spinel.

4. A thermally stable composite catalyst comprising a solid solution which consists essentially of at least one base metal oxide catalyst of spinel structure in solid solution with at least one refractory high-surface-area spinel, said base metal oxide catalyst being selected from the group consisting of $Co_3O_4$, $CoFe_2O_4$, $CoMn_2O_4$, $CuCr_2O_4$, $CuFe_2O_4$, $CuMn_2O_4$, $CuCo_2O_4$ and $ZnCo_2O_4$, and said refractory high-surface-area spinel being selected from the group consisting of $NiAl_2O_4$, $MgAl_2O_4$, $ZnAl_2O_4$, $CoAl_2O_4$, $CuAl_2O_4$, $CdAl_2O_4$, $MnAl_2O_4$, $NiCr_2O_4$, $CoCr_2O_4$, and $MgCr_2O_4$.

5. A thermally stable composite catalyst according to claim 4 wherein the refractory high-surface-area spinel is $ZnAl_2O_4$.

6. A thermally stable composite catalyst according to claim 4 wherein the refractory high-surface-area spinel is $NiAl_2O_4$, and wherein the base metal oxide catalyst is selected from the group consisting of $Co_3O_4$, $CoFe_2O_4$, $CuCr_2O_4$, $CuFe_2O_4$, $CuMn_2O_4$, $CuCo_2O_4$ and $ZnCo_2O_4$.

7. A thermally stable composite catalyst according to claim 4 wherein the refractory high-surface-area spinel is $Mg_2Al_2O_4$ and the base metal oxide catalyst is $CuFe_2O_4$.

* * * * *